United States Patent [19]
Dowling et al.

[11] Patent Number: 5,815,981
[45] Date of Patent: Oct. 6, 1998

[54] FLY TRAP

[75] Inventors: Earl Dowling; Todd Hummelle, both of Alberta, Canada

[73] Assignee: Allbrook Developments Ltd., Alberta, Canada

[21] Appl. No.: 837,389

[22] Filed: Apr. 17, 1997

[51] Int. Cl.[6] .................................................. A01M 1/14
[52] U.S. Cl. ............................................................ 43/114
[58] Field of Search .............................. 43/114, 115, 119, 43/121

[56] References Cited

U.S. PATENT DOCUMENTS

| | | | |
|---|---|---|---|
| 485,815 | 11/1892 | Koecher | 43/114 |
| 1,071,578 | 8/1913 | Rese | 43/114 |
| 1,087,058 | 2/1914 | Zielfeldt | 43/114 |
| 1,099,461 | 6/1914 | McMenamin | 43/115 |
| 4,217,722 | 8/1980 | McMullen | 43/121 |
| 5,022,179 | 6/1991 | Olson | 43/114 |
| 5,531,043 | 7/1996 | Shiboh | 43/121 |
| 5,608,988 | 3/1997 | Dowling et al. | 43/114 |
| 5,634,293 | 6/1997 | Mike et al. | 43/114 |

FOREIGN PATENT DOCUMENTS

| | | | |
|---|---|---|---|
| 2351595 | 12/1977 | France | 43/114 |
| 2058537 | 4/1981 | United Kingdom | A01M 1/14 |

*Primary Examiner*—Michael J. Carone
*Assistant Examiner*—Darren Ark
*Attorney, Agent, or Firm*—Anthony R. Lambert

[57] ABSTRACT

A fly trap includes a tubular body which is triangular in cross-section. One exterior face is coated with a sticky fly catching substance. A flap is secured to a peripheral edge of the sticky coated exterior face. In a stored position, the flap overlies the sticky coated exterior face. In a fly catching position, the flap is pivotally spaced from the sticky coated exterior face, thereby forming a "V" shaped trough. An interior surface of the flap is also coated with a sticky fly catching substance. An exterior surface of the flap has a sticky window adhesion strip.

1 Claim, 2 Drawing Sheets

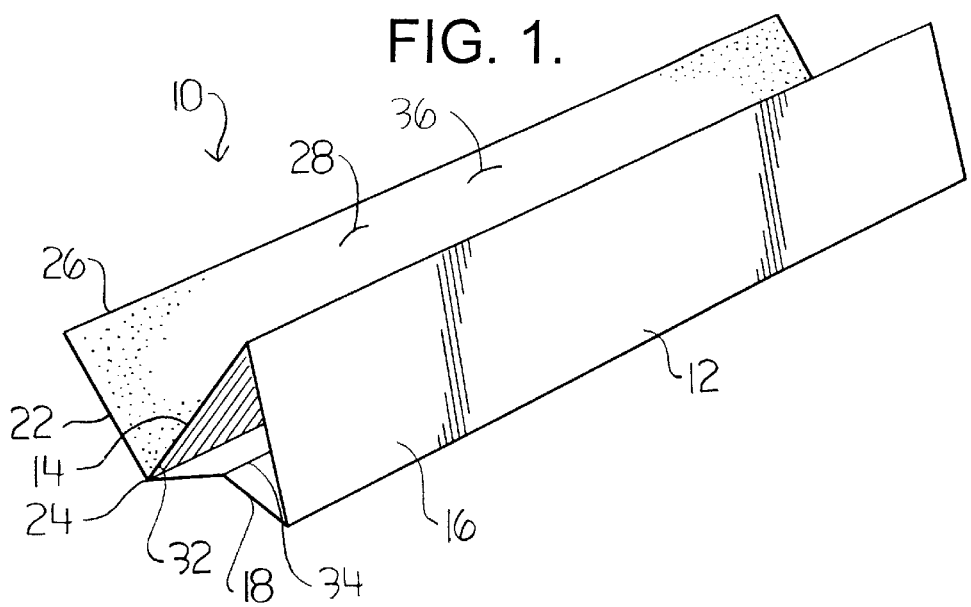
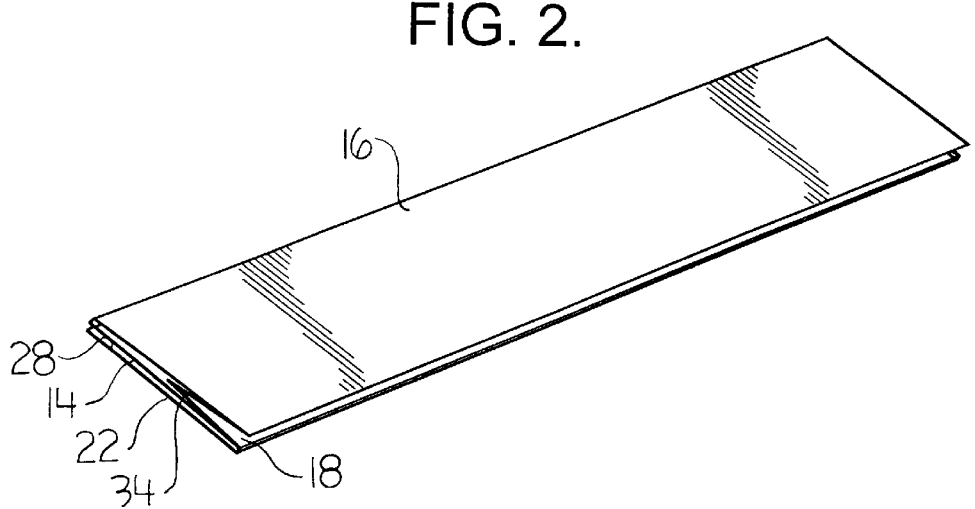

FLY TRAP

FIELD OF THE INVENTION

The present invention relates to a fly trap.

BACKGROUND OF THE INVENTION

U.S. Pat. No. 827,006 which issued to Gathmann et al in 1906 and U.S. Pat. No. 1,112,064 which issued to Gordon in 1914 both disclose tubular fly traps which are generally triangular in cross-section. An interior surface of these tubular fly traps is coated with a sticky substance, so that any fly that lands within the tubular body is held fast to the sticky interior surface.

U.S. Pat. No. 4,829,702 which issued to Silvandersson in 1989 and U.S. Pat. No. 5,022,179 which issued to Olson in 1991 both disclose fly traps that adhere to window glass. These fly traps take advantage of the natural propensity of flies to head toward the light provided at the window and dance up and down window glass looking for a means of escape.

U.S. patent application Ser. No. 08/585,899 (now U.S. Pat. No. 5,608,988) by Dowling and Hummelle discloses a triangular tubular fly trap with a sticky exterior surface and a method of catching files by positioning the triangular tubular fly trap on a window sill with the sticky exterior surface immediately adjacent to a pane of glass. The preferred manner of maintaining the triangular tubular fly trap in position on the window sill as taught by Dowling and Hummelle was by adhering the triangular tubular fly trap to the window sill.

SUMMARY OF THE INVENTION

What is required is a triangular tubular fly trap with improved means for maintaining the fly trap in position on the window sill.

According to the present invention there is provided a fly trap which includes a tubular body which is triangular in cross-section. The tubular body has three exterior faces. One of the three exterior faces is coated with a sticky fly catching substance. A flap is provided having a first edge, a second edge, an interior surface and an exterior surface. The first edge of the flap is secured to a peripheral edge of the one sticky coated exterior face. The flap is movable between a stored position and a fly catching position. In the stored position, the interior surface of the flap overlies the one sticky coated exterior face. In the fly catching position, the interior surface of the flap is pivotally spaced from the one sticky coated exterior face, thereby forming a "V" shaped trough with the one sticky coated exterior face. The interior surface of the flap is also coated with a sticky fly catching substance. The exterior surf ace of the flap has a sticky window adhesion strip along the second edge.

The fly trap, as described above, provides a number of advantages over the previous fly trap developed by Dowling and Hummelle. Firstly, it is held in position by the sticky window adhesion strip along the second edge of the flap, thereby eliminating the need to adhere the fly trap directly to a window sill. Secondly, the interior surface of the flap is also coated with a sticky fly catching substance, doubling the sticky coated area to which flies adhere.

BRIEF DESCRIPTION OF THE DRAWINGS

These and other features of the invention will become more apparent from the following description in which reference is made to the appended drawings, wherein:

FIG. 1 is a perspective view of a fly trap constructed in accordance with the teachings of the present invention, with the flap in a fly catching position.

FIG. 2 is a perspective view of the fly trap illustrated in FIG. 1, with the flap in a stored position.

DETAILED DESCRIPTION OF THE PREFERRED EMBODIMENT

Figure 3:
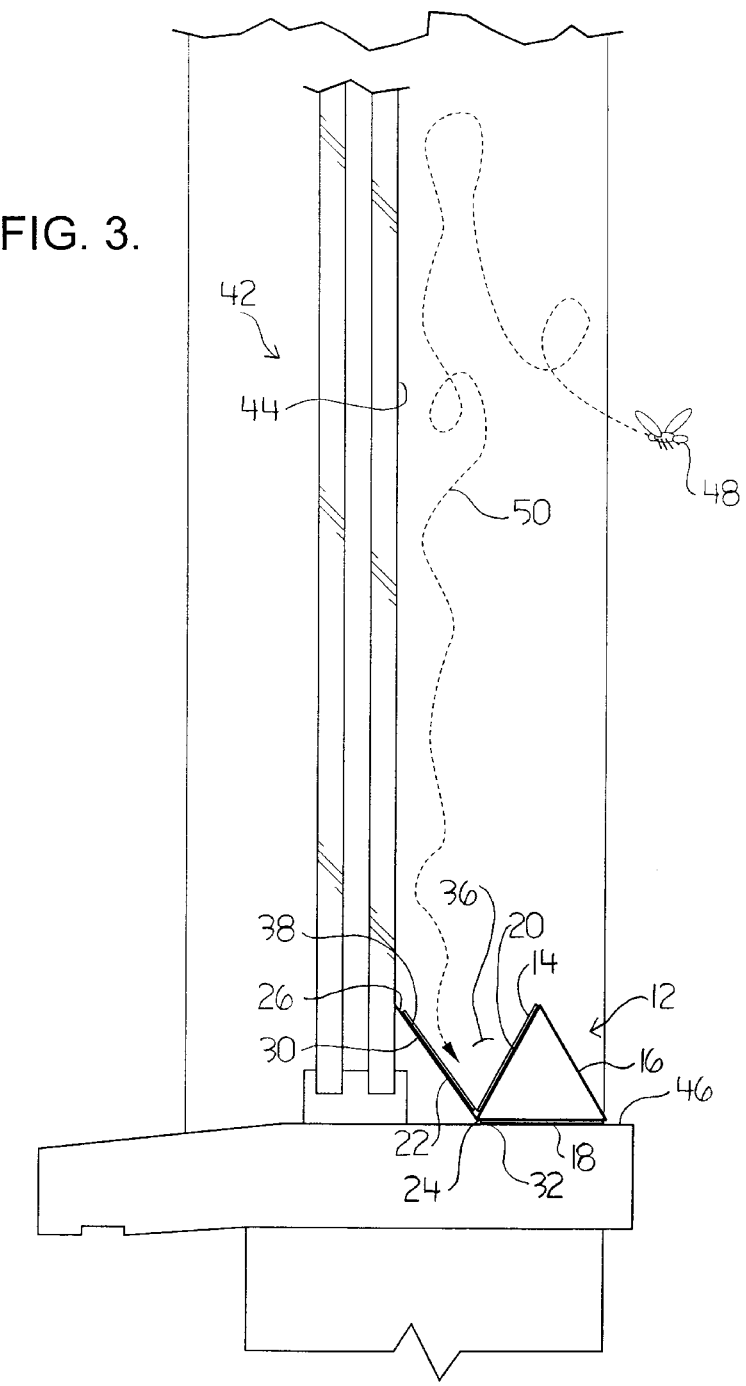
FIG. 3 is a perspective view of the fly trap illustrated in FIG. 1, positioned in accordance with the preferred method of use.

The preferred embodiment, a fly trap generally identified by reference numeral 10, will now be described with reference to FIGS. 1 through 3.

Referring to FIG. 1, fly trap 10 includes a tubular body 12 which is triangular in cross-section. Tubular body 12 has three exterior faces 14, 16, and 18, respectively. Referring to FIG. 3, one of the three exterior faces, exterior face 14 is coated with a sticky fly catching substance 20. Referring to FIG. 1, a flap 22 is provided having a first edge 24, a second edge 26, an interior surface 28. Referring to FIG. 3, flap 22 also has an exterior surface 30. Referring to FIG. 1, first edge 24 of flap 22 is secured to a peripheral edge 32 of sticky coated exterior face 14. Flap 22 is movable between a stored position, illustrated in FIG. 2, and a fly catching position, illustrated in FIGS. 1 and 3. Referring to FIG. 2, exterior face 18 has a fold 34 which enables tubular body 12 to be folded substantially flat when in the stored position. In the stored position, interior surface 28 of flap 22 overlies sticky coated exterior face 14. Referring to FIG. 1, in the fly catching position, interior surface 28 of flap 22 is pivotally spaced from sticky coated exterior face 14 of tubular body 12. This forms a generally "V" shaped trough, generally identified by reference numeral 36 with sticky coated exterior face 14. Referring to FIG. 3, interior surface 28 of flap 22 is also coated with a sticky fly catching substance 38. As well exterior surface 30 of flap 22 has a sticky window adhesion strip 40 along second edge 26.

The use and operation of fly trap 10 will now be described with reference to FIGS. 1 through 3. Referring to FIG. 3 there is illustrated a window, generally indicated by reference numeral 42. Window 42 has a pane of glass 44 and a window sill 46. A fly 48 is illustrated and the path that fly 48 follows down pane of glass 44 is noted in broken lines identified by reference numeral 50. Tubular body 12 is placed upon window sill 46. Flap 22 is pivoted to the fly catching position with sticky window adhesion strip 40 along second edge 26 secured to pane of glass 44. This places "V" shaped trough 36 in path 50 of fly 48. Interior surface 28 of flap 22 is coated with sticky fly catching substance 38. Exterior face 14 of tubular body 12 is coated with sticky fly catching substance 20. Should fly 48 enter "V" shaped trough 36 it is probable that it will adhere to either sticky coated exterior face 14 or sticky coated interior surface 28. When "V" shaped trough 36 is covered by numerous flies, flap 22 is returned to the stored position illustrated in FIG. 2, and fly trap 10 is disposed of.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A fly trap, comprising in combination:
   a pane of glass;
   a tubular body which is triangular in cross-section, the tubular body having three exterior faces, one of the three exterior faces being coated with a sticky fly catching substance;

a flap having a first edge, a second edge, an interior surface and an exterior surface, the first edge being secured to a peripheral edge of the one sticky coated exterior face, the flap being movable between a stored position and a fly catching position, in the stored position the interior surface of the flap overlying the one sticky exterior face, in the fly catching position the interior surface of the flap being pivotally space from the one sticky coated exterior face, the interior surface of the flap being coated with a sticky fly catching substance, the exterior surface of the flap having a sticking window adhesion strip along the second edge which is adhered to the pane of glass to form the one exterior face coated with the sticky fly catching substance and the interior surface of the flap coated with sticky fly catching substance into a "V" shaped trough.

* * * * *